United States Patent

[11] 3,586,947

| [72] | Inventors | Ronald J. Ilk;<br>Walter L. Rutchik, both of Milwaukee, Wis. |
|---|---|---|
| [21] | Appl. No. | 814,590 |
| [22] | Filed | Apr. 9, 1969 |
| [45] | Patented | June 22, 1971 |
| [73] | Assignee | Cutler-Hammer, Inc.<br>Milwaukee, Wis. |

[54] FULL-WAVE ADJUSTABLE MOTOR SPEED CONTROL SYSTEM WITH FEEDBACK
10 Claims, 1 Drawing Fig.

| [52] | U.S. Cl. | 318/331 |
|---|---|---|
| [51] | Int. Cl. | H02p 5/16 |
| [50] | Field of Search | 318/331, 345 |

[56] References Cited
UNITED STATES PATENTS

| 3,229,182 | 1/1966 | Kubler | 318/345 |
|---|---|---|---|
| 3,402,338 | 9/1968 | Thoresen | 318/345 |
| 3,470,437 | 9/1969 | Douglass | 318/345 |
| 3,475,672 | 10/1969 | Oltendorf | 318/331 |

Primary Examiner—Benjamin Dobeck
Assistant Examiner—Thomas Langer
Attorney—Hugh R. Rather ABSTRACT: A full-wave adjustable motor speed control system with feedback for automatic regulation of the speed of an AC motor such as a series or universal motor. A bidirectional thyristor triode in series with the motor armature winding is controlled by a firing circuit operated by a ramp and pedestal voltage. The ramp may be set at a fixed value whereas the pedestal is adjusted for desired speed and regulated by a feedback signal. This feedback signal is developed in an amplifying feedback circuit that is adjusted to eliminate unwanted characteristics and to provide a true speed signal proportional to motor counter EMF.

PATENTED JUN22 1971 3,586,947
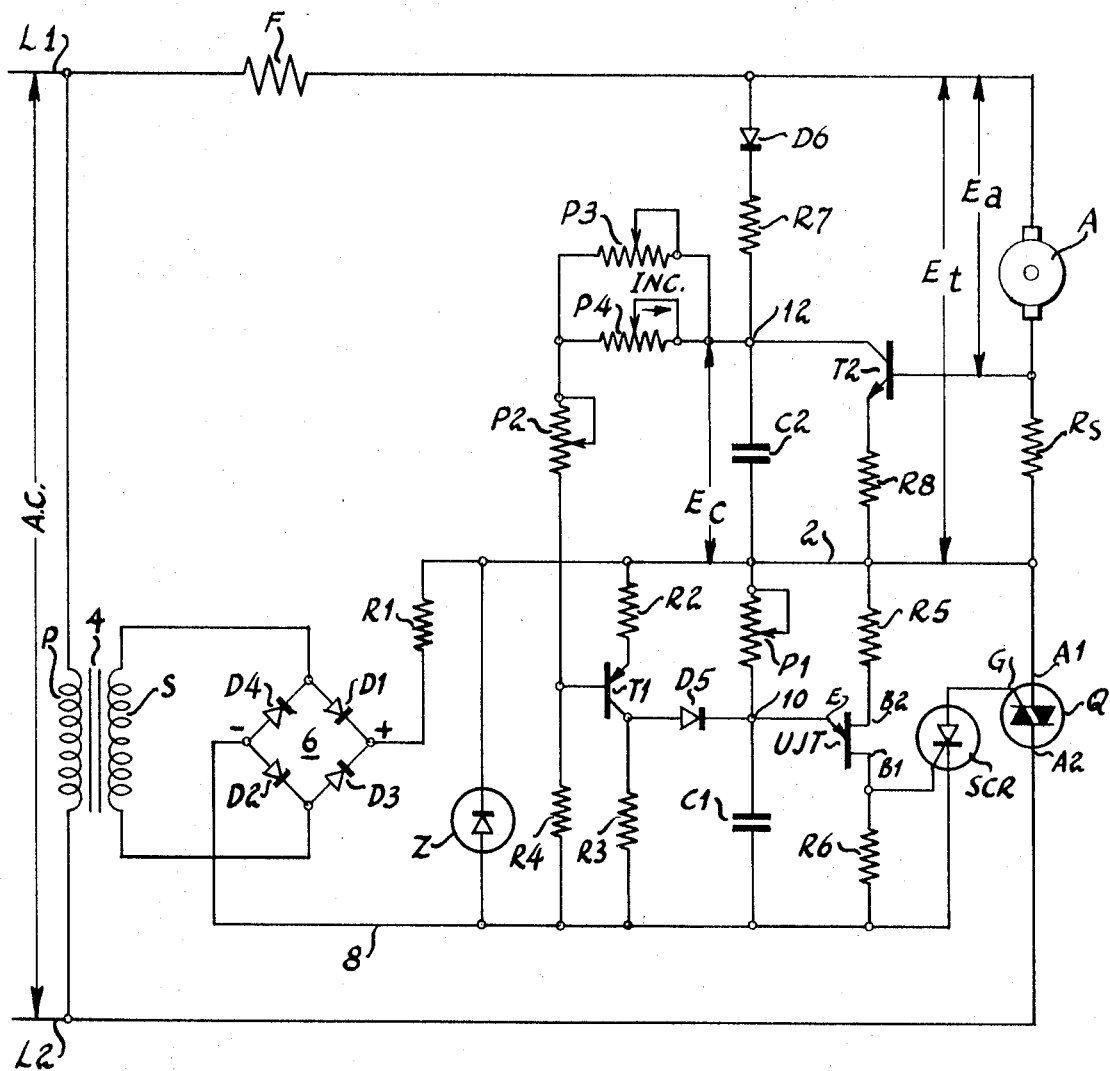
Inventors
Ronald J. Ilk
Walter L. Rutchik
By Wm. A. Autio
Attorney 3,586,947

FULL-WAVE ADJUSTABLE MOTOR SPEED CONTROL SYSTEM WITH FEEDBACK

BACKGROUND OF THE INVENTION

This invention relates to adjustable power control systems of the feedback-type for tool motor control.

Feedback-type motor control systems have been known heretofore. W. L. Rutchik copending application Ser. No. 746,120, filed July 19, 1968, and assigned to the assignee of this invention, discloses a speed control circuit of the half-wave-type having electrical feedback. The present invention is an improvement thereon.

SUMMARY OF THE INVENTION

This invention relates to full-wave systems with electrical feedback that are adapted for use in tool motor speed control or other adjustable power control applications.

An object of the invention is to provide an improved motor speed control system of the full-wave-type with feedback.

A more specific object of the invention is to provide a full-wave adjustable motor speed control system with improved feedback circuit means that provides a true speed signal that is unaffected by unwanted characteristics.

Another specific object of the invention is to provide a full-wave adjustable motor speed control system with improved feedback circuit means that provides a feedback signal proportional to motor counter EMF that is unaffected by other motor characteristics.

Other objects and advantages of the invention will hereinafter appear.

BRIEF DESCRIPTION OF THE DRAWING

The single FIGURE of the drawing shows a circuit diagram of a full-wave adjustable motor speed control system with electrical feedback constructed in accordance with the invention.

DESCRIPTION OF THE PREFERRED EMBODIMENT

Referring to the drawing, there is shown a feedback-type full-wave adjustable voltage motor speed control system supplied from an alternating current source AC of 120 volts or the like through lines L1 and L2. As shown therein, line L1 is connected through series field winding F, armature winding A, a signal resistor $R_s$, and then through the main electrodes of a bidirectional thyristor triode such as a Quadrac Q or a Triac. These main electrodes comprise a common electrode also known as an anode A1 and a high electrode also known as an anode A2. The Quadrac is also provided with a gate G that is its control electrode and will be referred to later in connection with the firing control circuit.

The control circuit, that is, the portion of the system shown in the drawing that controls firing of the Quadrac, comprises primarily two parts, the ramp and pedestal voltage part and the speed sensing part.

The ramp and pedestal circuit is shown as the lower half below conductor 2 and the speed sensing circuit is shown as the upper half above conductor 2.

The ramp and pedestal circuit is provided with a DC supply of 16 volts or the like. This DC supply comprises a stepdown transformer 4 having its primary winding P connected across power lines L1 and L2 and having its secondary winding S connected to the input terminals of a full-wave rectifier 6 having four unidirectional diodes D1—4 connected in bridge arrangement. The positive output terminal of the rectifier bridge is connected through a voltage dropping resistor R1 to conductor 2 whereas conductor 8 is connected to the negative output terminal of the rectifier bridge, there being a voltage regulating zener diode Z connected across conductors 2 and 8.

The DC supply functions as follows. On each positive half-cycle of source voltage, current flows from the upper end of the transformer secondary through diode D1, resistor R1, zener diode Z and diode D2 to the lower end of the secondary. On the alternate negative half-cycles of source voltage, current flows from the lower end of the transformer secondary through diode D3, resistor R1, zener diode Z and diode D4 to the upper end of the secondary. Zener diode Z clips these half-cycles of rectified voltage at 16 volts or the like.

The ramp and pedestal circuit is also provided with means for forming a pedestal voltage, that is, a voltage that rises rapidly to a predetermined adjustable value at the beginning of each half-cycle of source voltage, stays constant at this value throughout such half-cycle, and then falls rapidly to zero value at the end of the half-cycle. This means comprises a transistor T1 of the PNP conducting-type or the like having its emitter connected through a resistor R2 to conductor 2 and having its collector connected through a resistor R3 to conductor 8. The base of transistor T1 is connected through a resistor R4 to conductor 8 and is also connected to a control signal means hereinafter described. The output is taken from the collector of transistor T1 and applied through a unidirectional diode D5 to a junction 10 and to the positive voltage side of a capacitor C1 that has its other side connected to conductor 8.

The ramp and pedestal circuit is also provided with means for forming a ramp voltage, that is, a voltage that increases with respect to time, and for superimposing this ramp voltage on the aforementioned pedestal voltage. This means comprises a variable resistor P1 connected from conductor 2 to junction 10 and the aforementioned capacitor C1 connected from junction 10 to conductor 10 between this resistor and capacitor.

The output of the ramp and pedestal circuit is provided with triggering means for controlling Quadrac Q. This means comprises a unijunction transistor UJT and a semiconductor controlled rectifier (SCR). The unijunction transistor has its base B2 connected through a resistor R5 to conductor 2, its base B1 connected through a resistor R6 to conductor 8 and its emitter E connected to junction 10. The SCR has its anode connected to the gate of the Quadrac, its cathode connected to conductor 8 and its gate connected to base B1 of the unijunction transistor.

From the foregoing, it will be apparent that an input signal voltage at the base of transistor T1 that brings the base voltage lower than the emitter voltage causes this transistor to conduct in its emitter-collector circuit. Consequently, current will flow from conductor 2 through resistor R2, the emitter and collector of the transistor, and then in parallel branches through resistor R3 and through diode D5 into capacitor C1. This current flow will start near the beginning of each clipped half-cycle when the emitter voltage exceeds the base voltage and will quickly charge capacitor C1 to a predetermined fixed but adjustable value depending upon the input voltage at the base of transistor T1. This fixed but adjustable value of voltage on the capacitor is the aforementioned pedestal voltage. The height, that is, magnitude of this pedestal voltage can be selected by the magnitude of the input signal voltage at the base of transistor T1. This input signal at the base determines the current flow through the transistor and such current flow determines the voltage drop on resistor R3 which determines the height of the pedestal voltage.

A ramp voltage is developed by current flow through variable resistor P1 into capacitor C1. The slope of this ramp voltage which controls the system gain may be adjusted by adjusting the value of resistor P1. In practice, this slope is initially adjusted to a suitable value and then left fixed at that value. This ramp voltage is superimposed on the pedestal voltage in capacitor C1.

It will now be apparent that adjusting the height of the pedestal voltage while the ramp voltage slope remains fixed will change the point in time when the voltage at junction 10 reaches the critical triggering value of the emitter of the unijunction transistor. That is, if the pedestal voltage height is increased, the unijunction transistor will trigger earlier on each clipped half-cycle of supply voltage. And if the pedestal voltage is decreased in height, a later triggering will occur.

When the unijunction transistor triggers, capacitor C1 will be discharged through its emitter and base B1 circuit and resistor R6. The resultant voltage pulse developed across resistor R6 will cause a firing pulse of current to be applied to the gate of the SCR to fire the latter into conduction. This causes the gate of the Quadrac to be subjected to a negative current pulse to fire the Quadrac into conduction on each positive and negative half-cycle of the alternating current source.

The Quadrac is an alternating current switching device that is fired by its gate to conduct current in one direction on each positive half-cycle and to conduct current in the other direction on each negative half-cycle. A negative current pulse may be used to fire it into conduction on both positive and negative half-cycles. Following firing, the Quadrac then conducts to the end of the half-cycle when its sustaining current drops to a very small value.

The manner in which the input signal at the base of transistor T1 is controlled will now be described. This involves the speed sensing part of the system.

The speed sensing circuit shown in the upper half of the drawing above conductor 2 is provided with means for integrating a speed-proportional signal on positive half-cycles and for maintaining it through the negative half-cycles. This means comprises a unidirectional diode D6, a resistor R7 and a capacitor C2 connected in series in that order from the junction between the motor field and armature windings to conductor 2. Junction 12 between resistor R7 and capacitor C2 is connected through the collector and emitter circuit of a transistor T2 and a resistor R8 in series to conductor 2. Transistor T2 may be of the NPN conductivity-type or the like as illustrated. The base of this transistor is connected between signal resistor $R_s$ and the armature winding so that the voltage across the signal resistor controls the transistor.

The speed sensing circuit in the upper half of the drawing is also provided with combined speed reference signal means and means for mixing a speed signal with the speed reference signal. This means comprises a circuit extending from junction 12 to the base of transistor T1 having a low speed trimming (or limiting) variable resistor P2 connected in series with a pair of variable resistors P3 and P4 that are in parallel. Resistor P3 is a high speed trimming (or limiting) resistor and resistor P4 is a speed setter.

The operation of the speed sensing circuit, or counter EMF sensing circuit since the motor speed is proportional to its counter EMF, will now be described.

From the foregoing, it will be apparent that the voltage $Ea$ developed across the armature is equal to the current $Ia$ flowing through the armature winding times the resistance $Ra$ of the armature plus the counter EMF voltage $Eb$, or $$Ea = IaRa + Eb \quad (1)$$

If we intend to sense armature voltage for a speed control signal, we must eliminate the $IaRa$ term in the expression of equation (1). We would then end up with a true speed signal, which is $Eb$. $Eb$ is equal to a motor constant $K$ times the speed of the motor.

Since the armature current flows also through the sensing resistor $Rs$, the voltage $Et$ across both the armature and sensing resistor is as follows:

$$Et = IaRa + Eb + IaRs \quad (2)$$

Capacitor C2 would charge to the peak voltage $Et$ across the armature and sensing resistor were it not for the presence of transistor T2. However, with transistor T2 therein, the voltage $Ec$ across capacitor C2 is equal to $Et$ minus the voltage drop across diode D6 and resistor R7. Neglecting the small voltage drop across diode D6, then the capacitor voltage is equal to $Et$ minus the voltage drop across resistor R7, that is:

$$Ec = Et - Vr \quad (3)$$

The voltage drop across resistor R7, that is, $Vr$, is equal to the current $Ir$ flowing through the resistor times its resistance, or $$Vr = IrR_7 \quad (4)$$

Now, by substituting equations (2) and (4) into equation (3), we have the voltage across the capacitor equal to the voltage across the armature plus the counter EMF voltage plus the voltage across the signal resistor minus the voltage drop across resistor R7 as shown in the next equation:

$$Ec = IaRa + Eb + IaRs - IrR_7 \quad (5)$$
$$Ec = Ia(Ra + Rs) - IrR_7 + Eb \quad (6)$$

Now, it will be seen from equations (5) and (6) that if the term $IrR_7$ is made equal to the term $Ia(Ra+Rs)$, the voltage across the capacitor will be equal to the counter EMF voltage only, or $$Ec = Eb \quad (7)$$

The voltage $IrR_7$ may be made equal to the voltage $Ia(Ra+Rs)$ by controlling the values of the resistors and the gain of transistor T2. For this purpose, it can be seen that the armature current flows through signal resistor $Rs$ to produce a voltage drop thereacross. This voltage drop is applied to the base-emitter circuit of transistor T2 to control conduction in this transistor. This transistor controls the major portion of current flow $Ir$ in resistor $R_7$.

Therefore, when the load on the motor increases the slow it down, the motor current $Ia$ increases and through the action of transistor T2 causes the compensating current $Ir$ to increase proportionately. Conversely, when the motor load decreases allowing it to speed up, the motor current $Ia$ decreases and compensating current $Ir$ also decreases. Thus when properly balanced, the voltage drops $Ia(Ra+Rs)$ and $IrR_7$ can be maintained to be equal.

This may be done by adjusting the circuit so that the voltage across capacitor C2 at no load at a given speed is equal to the voltage across this capacitor under load and at the same speed. It will be seen that under these conditions the feedback voltage will not be dependent on the armature current that varies greatly between no load and loaded conditions but will be dependent only on the speed of the motor.

To do this in actual practice, resistors P3 and P4 are disconnected from junction 12 and a 100 kilohm potentiometer is substituted for resistor R7. The value of signal resistor $Rs$ is selected at one-fifth to one-tenth of the armature resistance and a variable resistor may be used therefor for adjustment purposes as hereinafter explained. Resistor R8 is given a value of 470 ohms but this may vary depending on the type of transistor T2 that is used, for example, a D29A5.

With the above arrangement, a no load speed is first set by adjusting resistor P1. Both the speed of the motor and the DC voltage across capacitor C2 are recorded. Resistor P1 is then adjusted to provide a higher motor speed and load is applied to the motor to reduce its speed to the previous recorded value. The DC voltage across capacitor C2 under the loaded condition is then compared with its DC voltage under the no load condition and resistor R7 is adjusted until the voltages are equal. Resistor R7 preferably should not be decreased below 10 kilohms to keep the current of transistor T2 within the control range and if balance cannot be obtained at or above that value, resistor $Rs$ should instead be adjusted to obtain the balance. Once this balance is obtained, it should serve for all motors of the same type provided the armature resistance does not vary substantially from motor to motor.

Since the counter EMF voltage of the motor is proportional to its speed, there is now developed across capacitor C2 a voltage that is proportional to speed that is a true speed signal. This speed signal is fed from junction 12 through speed setter P4 to the base of transistor T1 to produce a feedback effect to compensate for speed change and to maintain the speed constant under varying load.

Since the counter EMF voltage is being sensed only during the positive half-cycles of the source voltage, it is necessary for capacitor C2 to integrate this voltage and maintain it during the alternate negative half-cycles to avoid undesirable hunting effect.

The circuit for mixing the feedback signal with the speed reference signal is a resistive voltage divider circuit extending from junction 12 through variable resistors P3 and P4 in parallel, variable resistor P2, the junction at the base of transistor T1 and resistor R4 to conductor 8. Since this is a voltage divider, the voltage at the base of transistor T1 will be a predetermined value above ground potential depending on the values of the resistors and voltage Ec. This base voltage may be varied by varying the resistors.

For speed setting purposes, resistor P4 may be adjusted. Increasing the value of this resistor as indicated by the arrow thereat will increase the speed of the motor. This is because such resistor increase lowers the voltage at the base of transistor T1, causing greater conduction and earlier firing of the Quadrac. Conversely, decreasing resistor P4 decreases the motor speed setting. The voltage applied to the base of transistor T1 as a result of such speed setting is the speed reference voltage.

For high speed trimming purposes, resistor P3 may be adjusted. Since this resistor is in parallel with the speed setter, it will be seen that reducing the value thereof will reduce the high speed limit, that is, it will limit the high speed to which the motor can be turned to a lower maximum. Conversely, increasing the value of resistor P3 will allow the motor to be set to a higher maximum speed.

For low speed trimming purposes, resistor P2 may be adjusted. Since this resistor is in series with the speed setter, it will be seen that increasing the value thereof will reduce the low speed limit, that is, it will limit the low speed to which the motor can be turned to a higher value. Conversely, decreasing the value of resistor P2 will allow the motor be set to a lower minimum value by manipulation of the speed setter.

The feedback voltage that is proportional to motor speed is applied from capacitor C2 to junction 12 in the voltage divider hereinbefore described. It will readily be seen by reference to the drawing what the effect will be at the base of transistor T1 when a positive polarity feedback voltage that varies in magnitude with the speed of the motor is applied to junction 12.

Let it first be assumed that this feedback voltage raises the voltage level at junction 12, due to motor speed up on reduced load. This will cause a proportional rise in the voltage level at the base of transistor T1, bringing it closer to its emitter voltage. This will reduce the transistor conduction with a consequent decrease in pedestal voltage, a retardation of the Quadrac firing angle and a decrease in the power applied to the motor. Thus, an increasing feedback voltage, indicative of excessive motor speed because it is proportional to motor counter EMF, tends to reduce the applied power to the motor to reduce its speed.

Let it next be assumed that the feedback voltage lowers the steady state voltage level at junction 12, due to motor slowdown at increased load. This will cause a proportional lowering of the voltage level at the base of transistor T1, increasing the emitter-to-base voltage difference. This will increase the transistor conduction with a consequent rise in pedestal voltage, an advancement of the Quadrac firing angle and an increase in the applied power to the motor. Thus, a decreasing feedback voltage indicative of too low a motor speed tends to increase the power to the motor to speed up the motor.

The motor speed control system hereinbefore described provides distinct advantages over other known systems. It provides smooth adjustable speed control from zero to maximum speed. It provides excellent speed regulation, and limits hunting problems because of the compensated feedback sensing. It can be used with universal, permanent magnet or shunt-wound motors. The system is highly efficient, reducing power losses to a minimum and allows extremely small size packaging with its attendant economy. And this circuit provides extremely good feedback regulation over the entire speed control range.

While the system hereinbefore described is effectively adapted to fulfill the objects stated, it is to be understood that the invention is not intended to be confined to the particular preferred embodiment of full-wave adjustable motor speed control system with feedback disclosed, inasmuch as it is susceptible of various modifications without departing from the scope of the invention.

We claim:
1. In a motor control system having a motor power circuit including the armature winding of the motor connected to an alternating current source, a motor speed control system for adjusting and regulating the motor speed comprising:
   a switching device of the gating-type connected in the motor power circuit for controlling the amount of power applied to the motor;
   a firing control circuit supplied from said source for supplying a firing pulse to said switching device on each half-cycle of the alternating current source and including adjustable means for adjusting the firing angle of said pulses thereby to adjust the motor speed;
   and a speed sensing feedback circuit connected to the motor comprising:
   means for developing a feedback voltage that is proportional to the motor speed and independent of the magnitude of the motor current thereby to provide a true speed signal;
   and means for applying said feedback voltage to said firing control circuit to regulate the motor speed under varying load conditions;
   said means for developing a feedback voltage comprising:
   means for integrating the voltage appearing across the motor armature circuit;
   and means for balancing out the voltage drop due to the resistance of the motor armature circuit to develop in said integrating means only a voltage proportional to the motor speed which is the feedback voltage.

2. In a motor control system having a motor power circuit including the armature winding of the motor connected to an alternating current source, a motor speed control system for adjusting and regulating the motor speed comprising:
   an alternating current bidirectional switching device of the gating-type connected in the motor power circuit for controlling the amount of AC power applied to the motor;
   a firing control circuit supplied from said source for supplying a firing pulse to said switching device on each half-cycle of the alternating current source and including adjustable means for adjusting the firing angle of said pulses thereby to adjust the motor speed;
   and a speed sensing feedback circuit connected to the motor comprising:
   means for developing a feedback voltage that is proportional to the motor speed and independent of the magnitude of the motor current thereby to provide a true speed signal;
   and means for applying said feedback voltage to said firing control circuit to regulate the motor speed under varying load conditions;
   said means for developing a feedback voltage comprising:
   means responsive to the current in the motor armature circuit for subtracting from the armature circuit voltage the portion thereof attributable to the voltage drop due to motor armature circuit resistance to provide a resultant voltage proportional to motor counter EMF as a true speed signal:
   and means for integrating said resultant voltage on positive half-cycles of the source voltage and for maintaining it on alternate negative half-cycles.

3. The invention defined in claim 2, wherein said subtracting means comprises:
   a signal resistor in the motor armature circuit;
   and a current amplifier responsive to the voltage across said signal resistor for reducing the voltage applied to said integrating means.

4. The invention defined in claim 2, wherein said means for integrating the voltage comprises:
   a resistance-capacitance circuit connected across said motor armature circuit; and
   a unidirectional current conducting device in said resistance-capacitance circuit for allowing current flow therein only on each positive half-cycle of the source voltage.

5. In a motor control system having a motor power circuit including the armature of an electric motor connected to an alternating current source, a motor speed control system for adjusting and regulating the motor speed comprising:
- a bidirectional thyristor triode having a pair of anodes connected in the motor power circuit and a gate;
- a firing control circuit supplied from said source for supplying firing pulses to said gate on the half-cycles of the source voltage and including adjustable means for adjusting the firing angle of said pulses thereby to adjust the motor speed;
- and feedback voltage means for regulating the firing angle of said pulses to compensate for speed change under varying load comprising:
- means for canceling the portion of the voltage due to the resistance drop in said motor armature circuit to leave a resultant voltage proportional to the motor counter EMF that is proportional to motor speed;
- means for integrating said resultant voltage on positive half-cycles of the source voltage and for maintaining such integrated voltage during the alternate negative half-cycles as the feedback voltage;
- and means for applying said feedback voltage to said firing control circuit to compensate for speed change under varying load.

6. The invention defined in claim 5, wherein said means for canceling comprises:
- an amplifier for shunting current from said integrating means;
- and means responsive to the value of motor current for controlling said amplifier in proportion thereto.

7. In a motor control system having a motor power circuit including the armature of an electric motor connected to an alternating current source, a motor speed control system for adjusting and regulating the motor speed comprising:
- a bidirectional thyristor triode connected by its main electrodes in the motor power circuit for controlling the amount of power applied to the motor thereby to control its speed;
- a firing control circuit supplied from said source for supplying a firing pulse to the gate electrode of said triode on each half-cycle of the source voltage appearing on the main electrodes thereof and including:
- means for developing a pedestal voltage during each half-cycle of the source voltage;
- means for developing a ramp voltage during each half-cycle of the source voltage and superimposed it on the corresponding pedestal voltage;
- means operable when the sum of said pedestal and ramp voltages reaches a predetermined value for applying a firing pulse to the gate electrode of said triode;
- and adjustable means for varying the height of said pedestal voltage thereby to control the firing angle of said triode on each half-cycle of the source voltage;

said motor speed control system further comprising:
- feedback voltage means for regulating the height of said pedestal voltage including:
- a motor current sensing device in the motor power circuit;
- means including said motor current sensing device for removing the portions of the voltage due to the voltage drop caused by armature resistance and the voltage drop across said motor current sensing device to leave a resultant voltage proportional to the motor counter EMF that is proportional to motor speed;
- means for integrating said resultant voltage on positive half-cycles of the source voltage and for maintaining such integrated voltage during the alternate negative half-cycles as the feedback voltage;
- and means for applying said feedback voltage to regulate the height of said pedestal voltage to maintain the motor speed constant under varying load.

8. The invention defined in claim 7, wherein said means for integrating the voltage comprises:
- a unidirectional current conducting resistance-capacitance circuit connected across said motor armature and motor current sensing device.

9. The invention defined in claim 8, wherein said means including said motor current sensing device for removing the portions of the voltage comprises:
- a transistor amplifier responsive to the voltage across said motor current sensing device for shunting current from the capacitor in proportion thereto.

10. The invention defined in claim 9, wherein said means for applying said feedback voltage comprises:
- means connecting the voltage of said capacitor as a feedback voltage through said adjustable means to regulate the height of said pedestal voltage to compensate for variation in motor speed.

UNITED STATES PATENT OFFICE
CERTIFICATE OF CORRECTION

Patent No. 3,586,947                    Dated June 22, 1971

Inventor(s)     Ronald J. Ilk et al.

It is certified that error appears in the above-identified patent and that said Letters Patent are hereby corrected as shown below:

Column 2, line 31, after "conductor" insert -- 8. The pedestal and ramp voltage output is taken from junction --. Column 5, line 60, "zero to maximum speed" should read -- zero speed to maximum speed --.

Signed and sealed this 9th day of November 1971.

(SEAL)
Attest:

EDWARD M. FLETCHER, JR.              ROBERT GOTTSCHALK
Attesting Officer                     Acting Commissioner of Patents